June 10, 1969 B. MALINOWSKY 3,449,676

SIGNAL GENERATING SYSTEMS

Filed Feb. 9, 1961 Sheet 1 of 6

Inventor:
Boris Malinowsky
by McGlew and Toren

June 10, 1969 B. MALINOWSKY 3,449,676
SIGNAL GENERATING SYSTEMS
Filed Feb. 9, 1961
Sheet 2 of 6

Inventor:
Boris Malinowsky
by
McGlew and Toren

SIGNAL GENERATING SYSTEMS

Filed Feb. 9, 1961

Inventor:
Boris Malinowsky
by Muller and Toren

Inventor:
Boris Malinowsky
by
Nichols and Sorensen

Inventor:
Boris Malinowsky
by
Michaelson and Noren

Inventor:
Boris Malinowsky
by Nelson and Doren

United States Patent Office 3,449,676
Patented June 10, 1969

3,449,676
SIGNAL GENERATING SYSTEMS

Boris Malinowsky, deceased, late of Kirchheim, unter Teck, Germany, by Peter Becker, administrator, Munich, Germany, assignor to Bolkow Gesellschaft mit beschrankter Haftung, Hamburg, Germany Filed Feb. 9, 1961, Ser. No. 88,226
Claims priority, application Germany, Feb. 11, 1960, B 56,610
Int. Cl. H04b *1/04, 1/66;* H03k *7/00*
U.S. Cl. 325—142 18 Claims This invention relates to signal generators and, more particularly, to a carrier frequency generator whose internal resistance is variable independently for positive and negative half waves, and over a very wide range, by means of keying pulses.

In many applications, it is desirable to produce, from a single generator, two or more signal sequences, of different characteristics, in which the signals of the two sequences may be readily varied independently. Such signal sequences may be used, for example, to store two sets of information in computers instead of only a single set. As another example, the two signal sequences may be used as position, orientation, or directional controls, each sequence corresponding to a respective one of a pair of coordinates. One particular embodiment of this latter example is the guiding of a moving body toward a target using, for instance, a "joystick" or universely movable hand control, the signals being transmitted to the body either through wires or as radio signals.

A simple example of such signal sequences is the use of positive and negative half waves of rectangular pulses at what may be termed the carrier frequency, with the two sequences of carrier frequency pulses being blanked by respective and separate pulse sequences of a frequency lower than the carrier frequency, the blanking pulses being independently variable as to width. The width of the blanking pulses is determined by the desired information to be transmitted over each carrier pulse sequence or channel.

In the application of such signal sequences to the guiding of a body provided with acceleration control, it is helpful to the guiding control operator if the variation in the pulse width as a function of the displacement of the control is at a rate which increases in accordance with the amplitude of such displacement from a neutral position. It is even more helpful if the variation in the pulse width can be effected at a rate proportional to the speed of movement of the control. Furthermore, in such an application of two signal sequences, the control arrangement must operate satisfactorily over a temperature range from −40° C. to 70° C.

In accordance with the present invention a simple, novel and relatively inexpensive system capable of universal application and fulfilling the foregoing criteria is provided by a carrier signal generator, preferably producing rectangular positive and negative half-wave pulses at a carrier frequency, whose internal resistance can be varied independently, and over a very wide range, for the positive and negative pulses by utilizing keying pulses. These keying pulses are in two groups derived from a common source, with the individual pulses in each group being variable in width independently of each other in accordance with the respective information to be transmitted along each of the two carrier channels, one for the positive carrier pulses and the other for the negative carrier pulses. The generation and control of the pulses is effected solely by electronic means, preferably utilizing transistors.

As a feature of the invention, the variation of the width of the keying pulses, when a shiftable control is used, can be effected at a rate corresponding to the amplitude and rate of movement of the shiftable control, the amplitude being related to the neutral or center position of the control. Furthermore, the invention arrangement includes means for short-circuiting the output line or lines at the end of a respective pulse, to prevent an exponential decay of the trailing end of the pulse.

More specifically, the keying pulses are derived from a rectangular pulse sequence generated by an astable RC multivibrator. After the pulses of each sequence have passed through a respective separating stage, acting further as an impedance convertor, the pulses are integrated in another stage and fed to a Schmitt trigger circuit. The information providing means supplies, to each Schmitt trigger, an additional D.C. voltage component corresponding to the respective information to be transmitted over each channel. This control voltage intersects the pull-out line of the associated Schmitt trigger at a point depending on the control voltage value, so that there are provided rectangular pulses whose width corresponds to the respective control voltage whose value is determined by the respective information input. The carrier frequency pulse sequence is generated preferably by an RC multivibrator connected to the keying circuit through a transformer forming part of an oscillatory circuit.

For an understanding of the invention principles, reference is made to the following descriptions of typical embodiments thereof as illustrated in the accompanying drawings.

Figure 1:
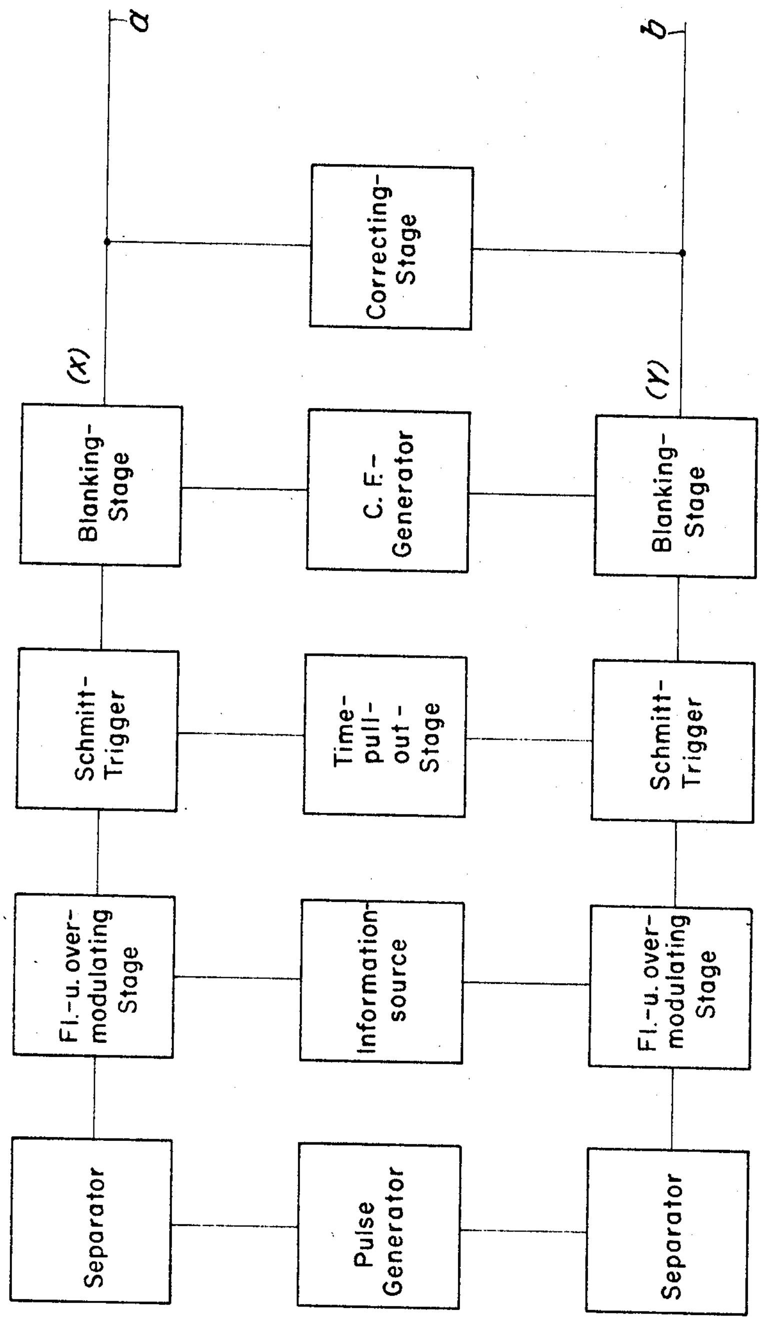
FIG. 1 is a block diagram of a signal generator and transmitter embodying the invention.

Referring to FIG. 1, a rectangular pulse generator 1 supplies rectangular pulses at the selected frequency. After passing through respective separator circuits 2*a* and 2*b* acting as impedance convertors, the two series of pulses are modulated in separate channels X and Y. The rectangular pulses are integrated in respective pulse flattening and overmodulating stages 3*a* and 3*b* and have superposed thereon D.C. control voltages independent of each other for each channel.

The D.C. control voltage components are supplied from an information source 4 which may, in the case of a guiding system, for example, comprise a universally movable control stick operating respective control potentiometers for each guiding coordinate. Depending upon the value of the D.C. control voltage component, which value corresponds to the information to be transmitted, the pulses will intersect the pull-out line of the respective Schmitt triggers 5*a* and 5*b* at predetermined levels.

The Schmitt triggers represent blanking generators providing output pulses at a uniform frequency but having variable keying ratios. These output pulses are fed to respective blanking stages 7*a* and 7*b* to blank the carrier pulses produced by carrier frequency generator 8.

If the signal utilizing apparatus is capacitatively loaded, distortions will appear in the output signals. To avoid this, for reasons explained hereinafter, a correcting stage 9 is provided and connected to both channels X and Y. A time-pull-out stage 6 is provided to block the blanking capacity of the carrier for a selected time.

Figure 2:
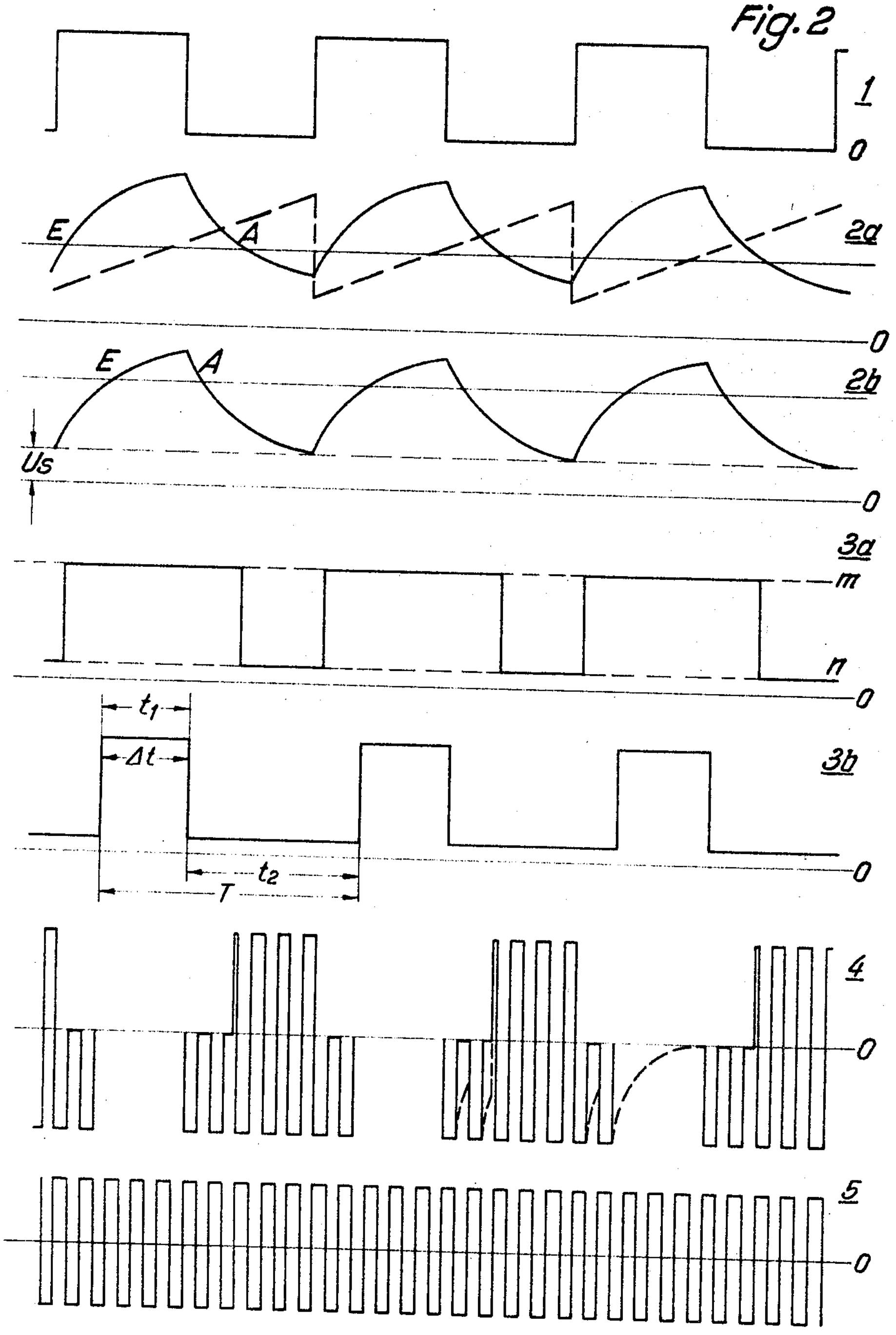
FIG. 2 is a series of diagrammatic illustrations of the pulse sequences according to the invention.
Figure 3:
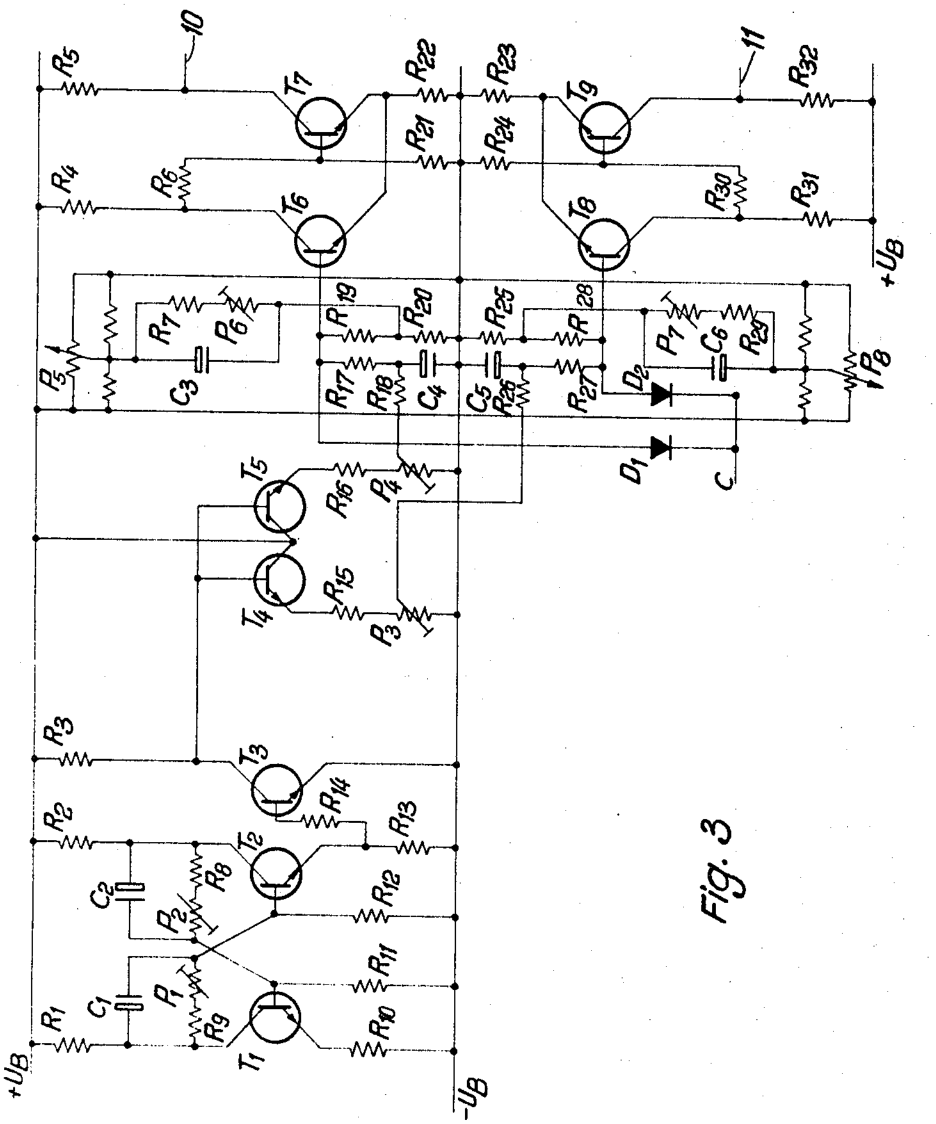
FIG. 3 is a schematic wiring diagram of the keying pulse generator.

The means for generating and varying the width of the blanking pulses will be understood best by reference to the diagrams of FIG. 2 and to FIG. 3. An RC multivibrator, comprising transistors T1 and T2, resistances R8 and R13 and condensers C1 and C2, forms a generator for a rectangular pulse sequence. The cycle period I and the keying ratio T1/T2 of the pulse sequence can be adjusted by potentiometers P1 and P2. Collector resistors R1 and R2 serve to increase the stability of the multivibrator. The generated pulses are derived from the emitter of transistor T2 and applied through resistance R14 to an amplifier stage comprising transistor T3 and resistance R3.

A rectangular voltage wave appears on the collector of transistor T3, the form being shown in illustration 1 of FIG. 2. This rectangular voltage wave is supplied to the separator stages *2a*, *2b* of FIG. 1, one stage comprising transistor T4 associated with channel X and the other stage comprising transistor T5 associated with channel Y, resistances R15 and R16 being included in the respective separator stages. The output signals derived from potentiometers P3 and P4 are integrated by the respective R–C combinations R26–C5 and R–18–C4, and combined with D.C. control voltages derived from potentiometers P5 and P8. The latter may be adjusted, by way of example, by means of a universally mounted control stick. The network further includes resistances R7, R17, R19, R20, R25, R28 and R29 and condensers C3 and C6. The combined signals are applied to the Ssmitt triggers *5a* and *5b* of FIG. 1.

The Schmitt triggers comprise, respectively, transistors T6 and T7 and transistors T8 and T9 connected in a known manner with resistances R4 through R6, R21 through R24, and R30 through R32. Rectangular pulses, with equal oscillation periods I and independently adjustable keying ratios T1/T2, appear on the collectors of transistors T7 and T9. The modulation ranges are set by potentiometers P3, P4 and P6, P7, respectively, so that no rectangular pulses are formed in the extreme positions of control potentiometetrs P5, P6, but only D.C. voltages of a corresponding amplitude. However, with the control potentiometers in the center position, rectangular pulses with the keying ratio T1/T2 equals 1 are formed at the outputs.

The pulse widths $\Delta t$ and the keying ratios $t1/t2$ can be varied continuously and symmetrically from $\Delta t$ equals 0 to $\Delta t$ equals 1. In sections *2a* and *2b* of FIG. 2, the stationary pull-out levels of the Schmitt triggers are shown as straight lines, for the sake of simplicity. Actually, the "on" point E and the "off" point A are not at the same level but at different levels depending upon the parameters.

As mentioned previously, in guidance systems for bodies having acceleration control, the rate of change of the signals should correspond to the amplitude of movement, from neutral, of the control device. In accordance with the invention, this is effected by control pulses in the form of a non-linear saw tooth voltage varying according to a logarithmic junction, as seen in parts *2a* and *2b* of FIG. 2. This assures variation of the pulse width $\Delta t$ as a function of the amplitude of movement of the control member, this amplitude being shown as A in FIG. 4. The pulse width $\Delta t$ thus varies from 0 to T about neutral, so that $\Delta t/\Delta\alpha$ at neutral is less than $\Delta t/\Delta\alpha at \alpha R$.

Taking the neutral position as the zero point of a rectangular coordinate system, the theoretical course of the control characteristic can be written mathematically as follows:

$\Delta t = T/2 + 2RC \operatorname{artgh} k\alpha$, where $\alpha$ indicates the amplitude of movement of the control member.

$k = U\alpha/Uo$ if $U\alpha$ is equal to the voltage of the respective control potentiometer with an amplitude of control member movement equal to $\alpha$, and if $Uo$ equals the peak value of integrating symmetrical rectangular voltage.

Figure 4:
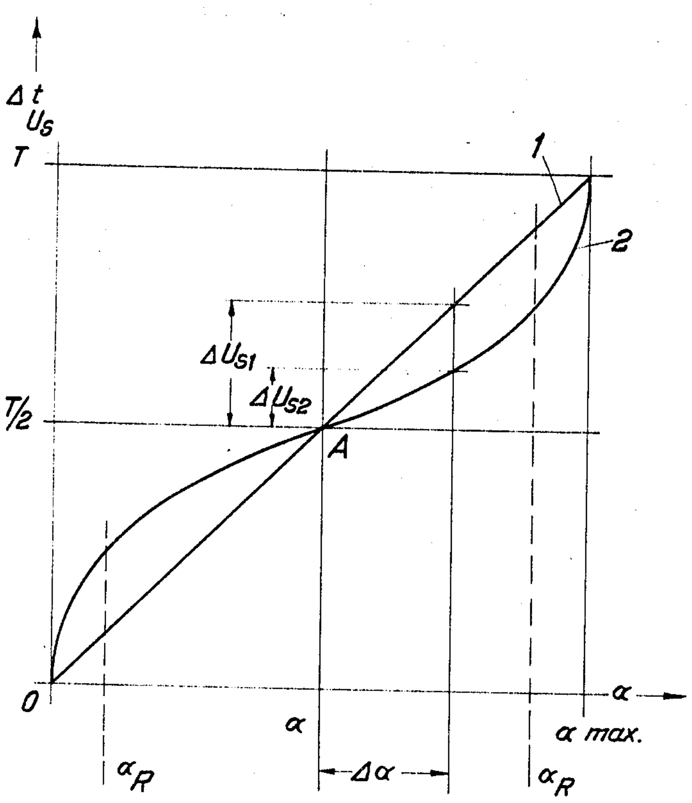
FIG. 4 is a diagram illustrating certain characteristic relations of the invention arrangement.

The degree of flattening, which is the inclination of the tangent at the point A of FIG. 4 is determined by the integration components R18, C4 and R26, C5, respectively. The weaker the integrated rectangular pulse (FIG. 2, part 1), the flatter the control voltage (FIG. 2, parts *2a* and *2b*), and the greater the degree of flattening of the control characteristic.

Condenser C3 and C6 provide overmodulation. If the control member is moved fast, a larger D.C. voltage component is applied to the bases of the modulating generator. The respective blanking generator therefore reaches a stationary state *m* or *n* much sooner. The length of the stationary state, which is the overmodulation, is a function principally of the amplitude of control member movement, the time constant of the overmodulating network, and the voltage of the control potentiometers P5 or P8.

The advantage of this method of flattening the control characteristic when used with overmodulation can be seen from the following. The known method of producing a flattened control characteristic is to use a linear sawtooth voltage, such as shown by the broken line in FIG. 2, part *2a*, for the blanking generators, and flattening the curve of the D.C. control voltage, which, in the case of a guidance system, is a function of the control element movement and designated *x*. This latter flattening can be effected by providing, at each control potentiometer P5, P8, two flattening resistances having their common junction connected with the slip ring and their free ends with the ends of the potentiometers, as shown in FIG. 3. The The curve of the control voltage $Us$ as a function of $\alpha$ is thus no longer the linear curve 1 of FIG. 4 but has the form of curve 2 of FIG. 4. With curve 2, $\Delta\alpha$ no longer corresponds to $\Delta Us1$ but to $\Delta Us2$, where the amplitude of the latter corresponds inversely to the degree of flattening effected by the flattening resistances.

In the flattening according to the invention, the steady state, following rapid changes in the control voltages, is attained much more quickly than with known flattening methods. As soon as the steady state is achieved, the overmodulating factor becomes independent of the degree of flattening of the control characteristic. This is of great advantage in the application of the invention to the field of missile guidance. In addition, the use of a linear sawtooth voltage has the disadvantage that linearity and constant amplitude can be achieved only with great difficulty, if at all, when using transistor circuitry over the range of $-40°$ C. to $+60°$ C.

The time pull-out stage 6 of FIG. 1 is effective for predetermined time intervals to provide, over the line C of FIG. 3, a signal which grounds the bases of transistors T6 and T8 through the diodes D1 and D2, depending on the polarity. This produces a steady level *n* (FIG. 2, part *3a*), at the outputs 10 and 11 of the blanking generators during such time intervals and independently of the control potentiometers P5 and P8. If the steady state *m* of FIG. 2, part *3a*, is required at the output during the time intervals, diodes D1 and D2 can be connected to the bases of transistors T7 and T9.

Figure 5:
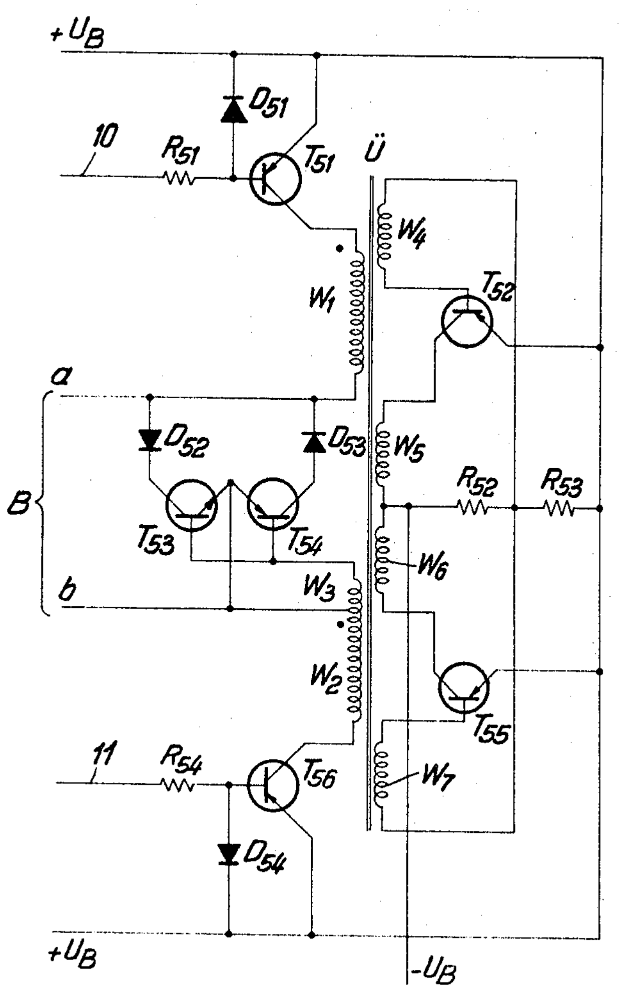
FIG. 5 is a schematic wiring diagram of the carrier frequency generator and the associated blanking stage.

Referring to FIG. 5, the carrier frequency generator 8 is a known self-oscillating RL-multivibrator comprising, essentially, transistors T52 and T55, windings W4 and W7 of transformer U, and resistances R52 and R53. The number of turns of the collector-feedback windings W5 and W6 is so selected that, with a given operating voltage $U_B$, the transformer core, which has a subsantially rectangular hysteresis loop, can be brought into the saturation region. Rectangular voltage pulses, of a frequency proportional to $U_B$ and inversely proportional to the saturation inductance $B_S$ of the core material, appear at the collectors of transistors T52 and T55. However, the frequency is independent of the peak value of the transistor current. If the carrier frequency is to be held constant over a range of about 100° C., voltage $U_B$ must be stabilized against variations due to temperature changes and the transformer core must be a material having a saturation inductance independent of temperature.

The blanking stages *7a*, *7b* of FIG. 1 comprise secondary windings W1, W2 of transformer U, transistors T51 and T56 of the PNP type, and diodes D51 and D54.

Windings W1, W2 are wound in the same direction, so that the total number of turns in these two windings determines the amplitude of the output signal. The transistor emitters are at a common potential. The collector of transistor T51 is connected to the outer end of winding W1, and the collector of transistor T56 is connected to the outer end of winding W2. The load B is connected across the inner terminals *a* and *b* of windings W1 and W2.

Blanking is effected by applying the blanking pulses (FIG. 2, parts 3*a* and 3*b*) to the bases of transistors T51 and T56 through respective resistances R51 and R54. The blanking pulses are applied through lines 10, 11 (FIG. 3 and FIG. 5). If the blanking generator of one channel *x* or *y* is at the steady state *m* (full battery voltage $+U_B$) the associated keying transistor is blocked, and vice versa. When the blanking generator is at the steady state *n*, the associated keying transistor becomes conductive. In this manner, the carrier frequency generator with a constant internal resistance, on the primary side of the transformer, becomes a generator whose internal resistance R*i* can be controlled independently for positive and negative half waves of the carrier pulse sequence, by the independently variable keying pulses. There is thus supplied to the load B the signal shown in part 4 of FIG. 2, and which comprises independently controlled positive and negative pulse trains. Two channels are thus provided for feeding data to the load.

The higher the switching dynamics of transistors T51 and T56, the longer is the interference interval. Therefore, in this stage the transistors used are preferably silicon transistors which have switching dynamics about 1000 times those of germanium transistors. Diodes D51 and D54 serve principally to improve the shape of the carrier pulses.

If the local circuit has a significant capacitance, as in the case of a feed wire to the load, distortions appear in the output signals as indicated by the broken lines of FIG. 2, part 4. These distortions are in the form of an exponential decay of the positive carrier frequency pulses when the negative carrier frequency pulses are blanked, and vice versa. This results in false information being supplied to the load.

To obviate this distortion, the correcting stage 9 is provided. Referring again to FIG. 5, this correcting stage comprises complementary transistors T53, T54, respective diodes D52, D53, and the transformer winding W3. The two emitters are commonly connected to one load conductor *b* and the collectors are connected to the other load conductor *a* through polarizing diodes D52 and D53. If the transistor bases are commonly connected to one end of winding W3, which supplies the bases with a control voltage 180 degrees out of phase with the output signals, the output is substantially short circuited, alternately for the positive and negative pulses, during the gap intervals between pulses. Thus, the discharge time constant is kept very small, and the carrier wave pulse trains maintain their rectangular shape independent of the impressed information.

Figure 6:
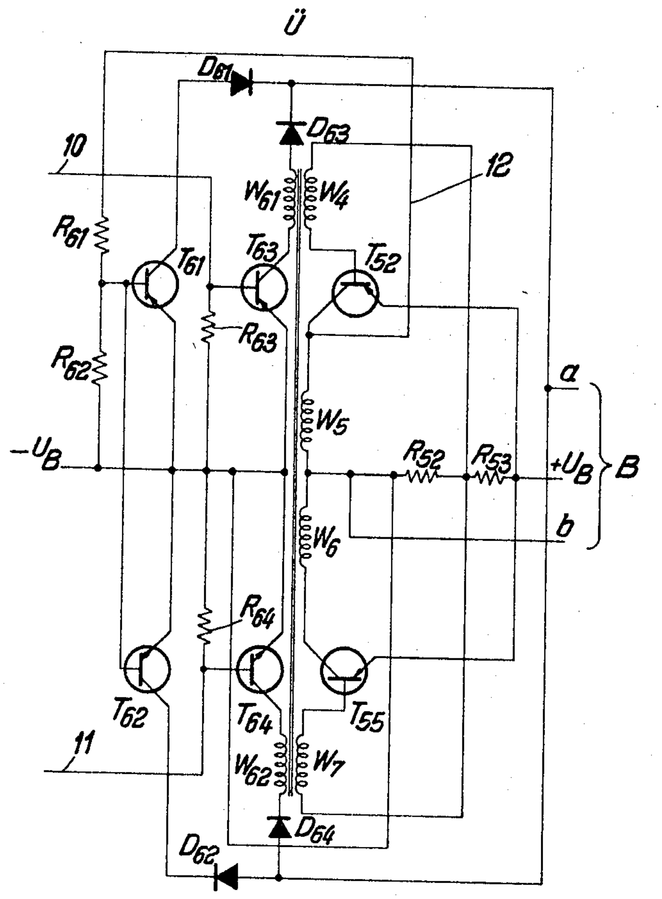
FIG. 6 is a schematic wiring diagram of a modification of the circuitry shown in FIG. 5.

FIG. 6 illustrates an alternative embodiment of the keying and correcting stages, parts corresponding to those of FIG. 5 being given the same reference designation. The load B is again supplied over conductors *a* and *b*, with line *b*, in the arrangement shown, being connected to $-U_B$. Windings W61 and W62 of transformer U are connnected in parallel, so that winding W61 supplies the positive portion of the output signal and winding W62 the negative portion. Thus, transistors T63 and T64 are complementary and require, for their control over conductors 10 and 11, keying pulses of polarities reversed with respect to $-U_B$ and $+U_B$, respectively, if the emitters are at $+U_B$.

The correcting stage is similar to that of FIG. 5 and comprises complementary transistors T61, T62 and diodes D61, D62. Control of the correcting stage can be provided by a secondary winding as in FIG. 5, or by means of a voltage divider R61–R62. The outer end of divider section R61 has applied thereto a voltage which is 180 degrees out of phase with the output signal and must be symmetrical with the common potential of the two emitters of the transistors T61 and T62. When a self-oscillating RL-multivibrator (T52, T55, W4 to W7, R52, R53) is used, this control voltage is derived from a collector of transistor T52 or transistor T55, depending on the particular phase thereof. As shown in FIG. 6, the control voltage is derived from the collector of transistor T52 through conductor 12. Diodes D61 through D64 are polarizing diodes for the respective transistors, and the circuit further includes resistances R63 and R64.

When the invention arrangement is used in a directional control system, the arrangement of FIG. 5 is more advantageous from a cost standpoint. For other applications, and particularly where the potential at one load terminal must be either $+U_B$ or $-U_B$, the arrangement of FIG. 6 is necessary, including the particular carrier frequency generator.

Known methods of bilaterally blanking a symmetrical wave train, for example by using a transformerless push-pull amplifier with complementary transistors, or by using diode gates, involve expenditures which are a multiple of the cost of the invention ararngement. In these methods, poistive and negative direct voltages, having amplitudes substantially equal to the peak value of the output signals, are required. Since transistors are usually operated at about 6–10 volts, while the output voltage, required to control a moving body, for example, must be about 70 volts, a voltage transformer from which positive and negative voltages each of about 35 volts can be tapped, is required with such known systems.

While specific embodiments of the invention have been shown and described in detail to illustrate the application of the invention principles, it will be understood that the invention may be embodied otherwise without departing from such principles.

What is claimed is:

1. A signal generating system comprising, in combination, a signal generator producing positive and negative half wave carrier pulse trains, and having an internal resistance; a source of keying pulses; keying circuit means operable to modulate said carrier pulses by said keying pulses; and means, including said keying pulses and circuit connections to said generator, effective to vary the internal resistance of said generator over a wide range independently for the positive and negative half waves.

2. A signal generating system as claimed in claim 1 in which said generator is an LR-multivibrator including a transformer forming part of its oscillatory circuit.

3. A signal generating system as claimed in claim 1 in which said keying circuit includes a pair of transistors having their emitters at a common potential; circuit means coupling the transistor collectors to said generator; and means for applying the keying pulses to the transistor bases.

4. A signal generating system as claimed in claim 3 in which said circuit means comprises a transformer having a pair of windings connected in series; said collectors being connected to the outer ends of said windings.

5. A signal generating system as claimed in claim 3 in which said circuit means comprises a transformer having a pair of windings each having an input end and an output end and connected in parallel; said collectors being connected to the input ends of said windings.

6. A signal generating system as claimed in claim 3 in which said circuit means comprises a transformer; and said generator is an LR-multivibrator including said transformer forming part of its oscillatory circuit.

7. A signal generating system as claimed in claim 1 including means operable during selected time intervals to short circuit the output lines of said system at the end of signal pulses of each polarity to reduce the pulse decay time to a negligible value.

8. A signal generating system as claimed in claim 7 in which said short circuiting means includes a pair of transistors having grounded emitters; means, including polarizing means, connecting the transistor collectors to one output line; and means applying the generator output voltage, displaced 180 degrees in phase from the output signal, to the transistor bases.

9. A signal generating system as claimed in claim 7 in which said short circuiting means includes a pair of transistors; means, including polarizing means, connecting the transistor collectors to one output line; means commonly connecting the transistor emitters to the other output line; and means applying the generator output voltage, displaced 180 degrees in phase from the output signal, to the transistor bases.

10. A signal generating system comprising, in combination, a signal generator producing positive and negative half wave carrier pulse trains; a source of keying pulses; means operable to modulate said carrier pulses by said keying pulses, independently as to positive and negative carrier pulses; and control voltage means connected to said keying circuit means and effective to vary the width of said keying pulses independently of each other in such a manner that, with equal keying periods, the keying ratio for positive and negative output pulses is independently varied.

11. A signal generating system as claimed in claim 10 including means effective to vary the keying pulse width non-linearly with respect to the control voltage.

12. A signal generating system as claimed in claim 10 including means effective to vary the keying pulse width in dependence upon the amplitude and rate of variation of the control voltage.

13. A signal generating system as claimed in claim 10 in which said source is an astable multivibrator; a pair of separator stages in series with said multivibrator and acting as impedance convertors; a pair of integrating stages each in series with a respective separator stage; and a pair of Schmitt triggers each in series with a respective integrating stage; whereby a pair of keying pulse channels are formed for independent regulation of the width of pulses travelling the respective channels.

14. A signal generating system as claimed in claim 13 in which the control voltage is varied in accordance with the position of a manual control element.

15. A signal generating system as claimed in claim 14 including means in said integration stages flattening the control characteristics of said control element.

16. A signal generating system as claimed in claim 15 in which each integration stage includes RC elements and generates an output signal which is combined with a direct voltage component; and control potentiometer means operable to vary the direct voltage component of each integration stage independently of that of the other integration stage.

17. A signal generating system as claimed in claim 16 including a time dependent element in series with the adjustable tap of each potentiometer so that, with rapid variations of the potentiometer, a steady state is attained more rapidly than with slow variations.

18. A signal generating system as claimed in claim 10 including Schmitt trigger blanking generators each including a transistor; a time determining stage; and a pair of diodes each connected between said stage and a respective transistor; whereby to render non-conductive one or the other of said transistors depending on the polarity of the respective signal.

References Cited

UNITED STATES PATENTS

| | | | |
|---|---|---|---|
| 2,879,501 | 3/1959 | Baran | 332—14 |
| 2,962,602 | 11/1960 | Decker et al. | 332—9 |

RODNEY D. BENNETT, Jr., *Primary Examiner.*

C. E. WANDS, *Assistant Examiner.*

U.S. Cl. X.R.

325—139; 332—9, 12, 14

PO-1050
(5/69)

UNITED STATES PATENT OFFICE
CERTIFICATE OF CORRECTION

Patent No. 3,449,676 Dated June 10, 1969

Inventor(s) B. MALINOWSKY

It is certified that error appears in the above-identified patent and that said Letters Patent are hereby corrected as shown below:

Column 1, line 5, for "Hamburg" substitute -- Munich --

SIGNED AND
SEALED
NOV 25 1969

(SEAL)
Attest:

Edward M. Fletcher, Jr.
Attesting Officer

WILLIAM E. SCHUYLER, JR
Commissioner of Patents